United States Patent Office 2,879,642
Patented Mar. 31, 1959

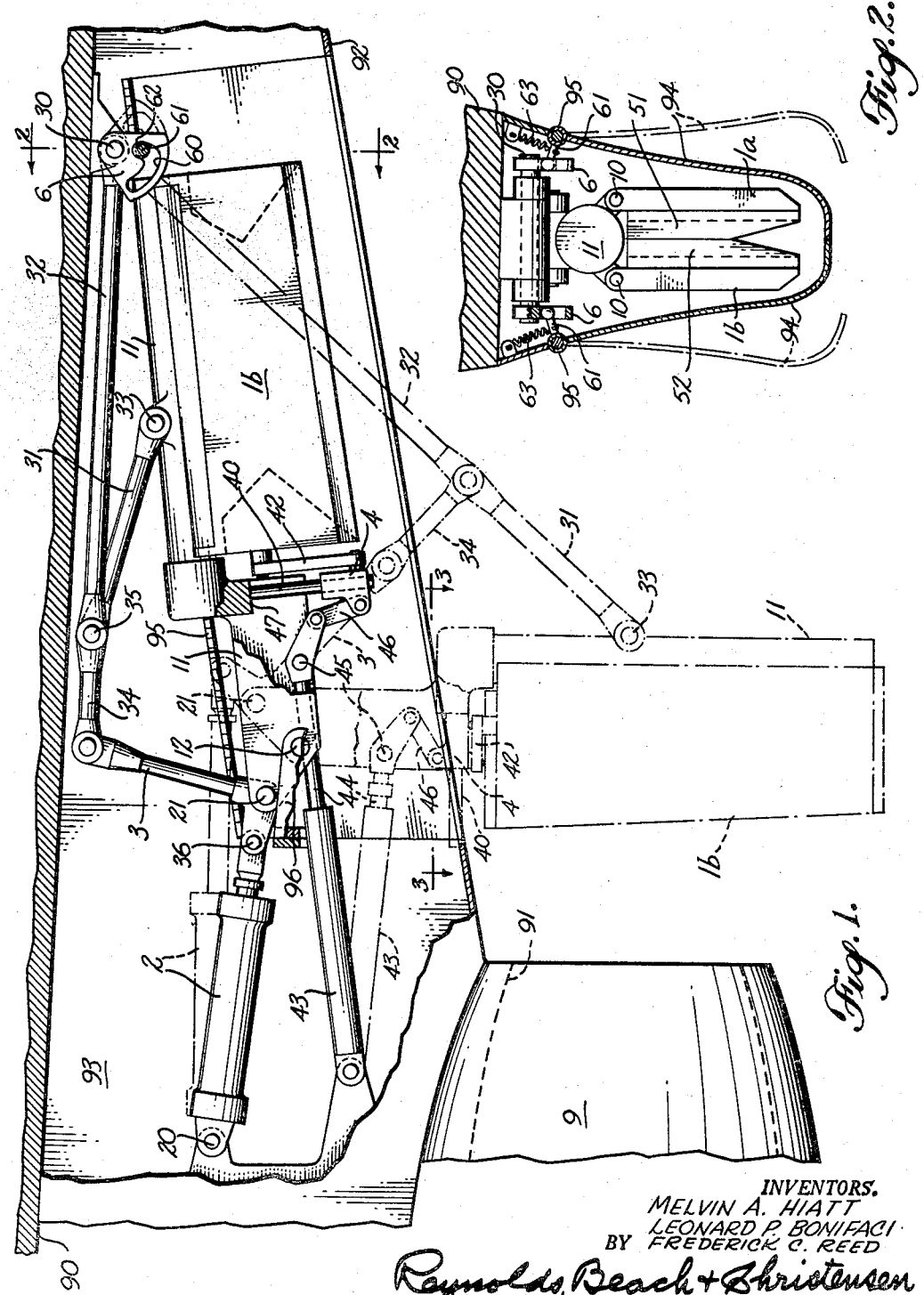

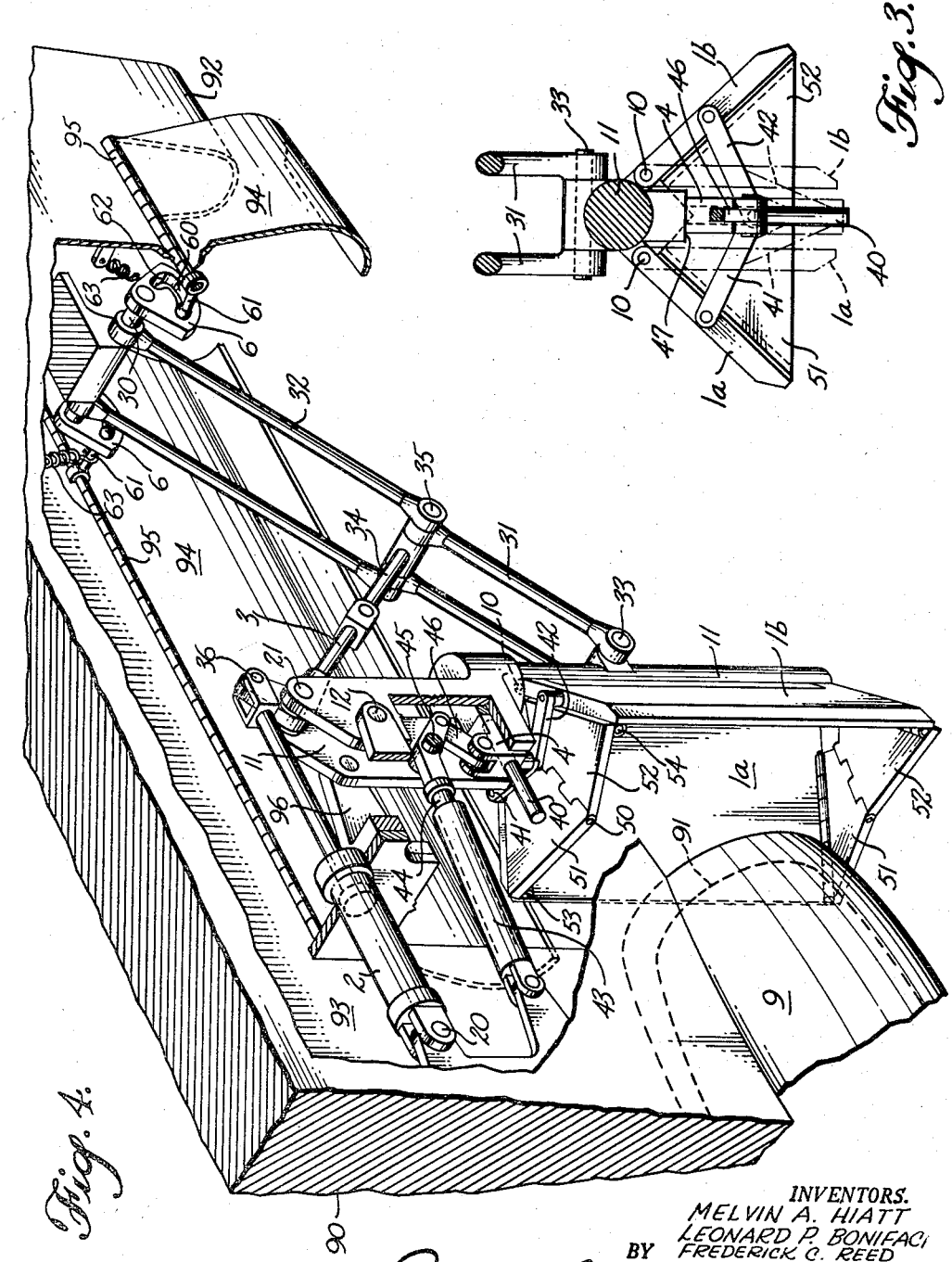

2,879,642

V-GUTTER THRUST-REVERSERS

Melvin A. Hiatt, Puyallup, Leonard P. Bonifaci, Mercer Island, and Frederick C. Reed, Seattle, Wash., assignors to Boeing Airplane Company, Seattle, Wash., a corporation of Delaware Application June 16, 1954, Serial No. 437,145

16 Claims. (Cl. 60—35.6)

As a substitute for reversing the pitch, and hence the thrust, of the propeller blades of a conventional propeller-driven airplane, it is a practice in jet-propelled airplanes to provide devices which at the appropriate time can be moved into a location to the rear of the exit of the tailpipe of the jet engine, in position to intercept the issuing jet stream, and to direct that jet stream more or less forwardly. By such means it is possible to check the forward momentum of a jet-propelled airplane upon landing. Examples of devices to that end are found in the Lundberg Patent No. 2,620,622, dated December 9, 1952, and in the co-pending applications of George T. Drakeley, Serial No. 394,728, filed November 27, 1953, now Patent No. 2,839,891, and of Harry A. Stavert, Serial No. 411,872, filed February 23, 1954 now Patent No. 2,780,057.

In each of these prior art structures the jet-impinged baffles are mounted directly upon the jet engine itself, in the vicinity of the tailpipe exit. Since obviously they cannot be supported in operative position during normal flight, but must be movable thereinto only at the time thrust reversal is required, they are perforce mounted for movement between the operative and some inoperative position. It is equally obvious that they must be, when inoperative, located out of the relative air stream, as well as removed from the jet stream. Heretofore they have been retractable within the jet engine housing upon which they are mounted, and projectable therefrom. All such jet engines, in the vicinity of the tailpipe exit, are very limited as to space within which to retract and store such deflector devices, and this in turn imposes restrictions on the size, shape and disposition of the deflecting surfaces, when they are in their operative position; the mechanism for effecting retraction and projection thereof is, in such a location, subject to very high temperatures; frequently the rear terminal contour or edge shape is critical, and is impaired by such retracted baffles; their presence impairs access to the engine where necessary. It follows that such a location as has been proposed heretofore may not be the most desirable one.

Primarily it is the object of the present invention to provide a thrust-reverser device which avoids the disadvantages and drawbacks indicated above, and more particularly, to provide a jet thrust-reverser device of a size, shape, relative disposition of its component parts, and capable of location in the best operative relationship to the jet engine's tailpipe when jet thrust reversal is required, which shall provide a large and forwardly directed reverse thrust, yet a device of such nature that it can readily be retracted and stored within aircraft structure such as the engine-supporting structure, when its use is not required, so that it offers no impairment to free access to the engine, and which more particularly can be contracted or folded and stored in the small space available in a certain accepted design of the engine-supporting structure, and moreover, a jet thrust-reverser device which will impose minimum or no penalties in weight, space, and drag, and which during normal flight will produce no interference with the issuing jet, and will require no especial measures to protect it or its operating mechanism from excessive heat, to which the jet stream intercepting surfaces only are subjected, during such time, only, as the jet thrust-reverser device is in its operative disposition.

Thereby the jet engine, especially that portion lying in the vicinity of the tailpipe, is completely relieved of any necessity for storing, supporting or becoming affected by the shape of the thrust-reverser mechanism, or of resisting reverse thrust loads, and the thrust-reverser device in turn may be of any necessary size, shape, and disposition, and it is completely unaffected by the heat of the engine until moved to operative position, and then only so long and in such portions as are required to bring the airplane to a controllably low speed along the ground surface. Its operating mechanism is at all times protected from the heat of the jet stream, the thrust-reverser mechanism being provided with vanes which serve that purpose while parts are in the operative position.

One of the special problems in thrust-reverser mechanism of the former type mentioned above was the provision of sufficient surface area, properly related and properly oriented relative to the tailpipe exit, to produce a substantially fully reversed thrust upon interception of the issuing jet. It is one of the special objects of this invention to provide a jet thrust-reverser device of such nature as will provide adequate surface areas, properly oriented with relation to other such surface areas, and properly disposed as a whole relative to the exit of the tailpipe, to produce a high degree of reverse thrust and to deflect the jet stream almost directly forwardly.

Reference has been made to the retraction of the thrust reverser device in an accepted design of engine-supporting structure. Such supporting structure is primarily a narrow strut directed downwardly and forwardly from a wing to suspend the jet engine at its lower forward end. Such a strut is of slight transverse extent relative to the transverse extent of the jet engine. The jet thrust-reverser device, which must be retracted into the narrow strut, must in its operative position be spread widely enough to intercept substantially all the jet stream issuing from the exit of the tailpipe. It follows that the thrust-reverser device, in addition to being retractable, must be foldable or contractable, in order that it may be retracted within a recess in the narrow strut, and upon emergence from the recess it must be expandible while it is being or after it has been projected, in order that it may spread widely enough when in operative position to intercept the jet stream. The provision of a thrust-reverser device and operating mechanism for the same of a nature to accomplish the above is a further object of this invention.

A V-gutter form has been found very satisfactory, although this shape is not critical, and a U-gutter form is almost equally satisfactory, provided in each instance the ends of the gutter are closed to avoid escape of the intercepted gas, and to direct it forwardly. Since the thrust reverser must be folded into small enough compass to enter the recess in the narrow strut, referred to above, the V-gutter shape seems more practicable, and moreover, it is better adapted to the employment of foldable end closure vanes, such as may be folded coincidentally with and coordinated with the folding or contraction of the other elements of the thrust-reverser device. The provision of means to these ends constitutes a further object of this invention.

Because the shape of the gutter is not critical, as stated above, it will be understood that the term "V-gutter" as used herein is intended to include a gutter of any appropriate shape in cross-section, unless the context clearly indicates otherwise.

In former designs of jet thrust-reversers, wherein the thrust-reverser devices were mounted directly upon the engine, the reverse thrust loads were imposed upon the engine and through the engine upon the engine-supporting structure. In the present design, wherein the thrust-reverser device is mounted upon the engine-supporting structure, but not directly upon the engine, it is necessary to provide mechanism for supporting and accomplishing the projection and retraction of the thrust-reverser device which will adequately transmit the thrust-reversing loads to the supporting structure reasonably directly, and at the shortest feasible moment arms, so as to avoid the necessity of greatly strengthening, and thereby increasing the weight of, the operating mechanism. The provision of devices to this end is a still further object of this invention.

With the above objects in mind, and still others as will appear more fully hereinafter, the present invention comprises the novel thrust-reverser device as a whole, the novel cooperative relationship between the parts thereof, and the novel cooperative relationships between the thrust-reverser device and its parts, on the one hand, and the jet engine, particularly the tailpipe exit thereof, on the other hand, and still further with relation to the supporting structure whereon the thrust-reverser device is mounted. In the accompanying drawings the mechanism is shown in a somewhat diagrammatic form, and it will be understood that in its details the showing is intended to be suggestive rather than limiting.

Figure 1 is a side elevational view of the operating mechanism and the thrust-reverser baffles, shown in fully retracted position in full lines within the sectionally shown strut, and showing the same mechanism in projected position in dot-dash lines.

Figure 2 is a transverse sectional view along the line indicated at 2—2 in Figure 1, illustrating particularly the door or closure means.

Figure 3 is a sectional view on the line indicated at 3—3 in Figure 1, but taken as though the thrust-reverser baffles were in their fully projected or operative position. Their retracted position with relation to their mounting is shown in dot-dash lines in the same view.

Figure 4 is an isometric view, with parts broken away and shown in section, illustrating the parts in their fully projected and operative position.

The rear end of a jet engine is represented conventionally at 9, and it is intended to illustrate at 91 the exit end of its tailpipe. Such an engine, in a well-known airplane design, is mounted at the lower end of a transversely narrow, generally vertically disposed strut, represented at 90. The lower edge of this strut, to the rear of the exit of the tailpipe 91, is inclined gradually upwardly and rearwardly as is indicated at 92. This strut supports the engine 9 projected forwardly beneath a wing structure (not shown).

For the purposes of this invention the strut 90 is recessed in this lower edge immediately behind the rear end of the engine, the recess being indicated at 93, and desirably this recess is completely and smoothly closed in except when the thrust-reverser means are in operative position. Closure means, such as the two doors 94, hingedly mounted at 95, are shown as typifying elements suitable to that purpose, although not necessarily as the best means for the purpose.

The thrust-reverser device proper consists essentially of two leaf baffles 1a and 1b and vanes 51 and 52 for closing the ends of the V-gutter formed between the baffles 1a and 1b. The baffles 1a and 1b are hingedly connected together, or to a common support, such as the post 11, to swing from a folded position or contracted relationship wherein their inner or facing surfaces are close together or in substantially parallel planes, to an unfolded position or expanded relationship wherein they are outspread, and their inner surfaces diverge forwardly from their hinges at 10 upon the post 11. While it will be clear later that the post 11 is not always upright, and so the hinged edge of the baffles is not always at the rear, this is the case when they are in their operative position, and it will be convenient to refer to their hinging at their rear edges, and to refer to their divergence forwardly.

The thrust-reverser device is movable into an operative position, located behind the exit of the tailpipe 91, from a retracted position within the recess 93, and vice versa, by mounting the post 11 pivotally within the recess 93 to swing about a transverse, substantially horizontal axis 12, which is carried by suitable fixed brackets or similar supporting means at 96 within the recess 93. A hydraulic actuator 2, pivotally supported at 20 upon the aircraft structure and connected in effect at 21 to the mounting 11 above the pivot 12, serves to swing the mounting from a more or less horizontal retracted position, as shown in full lines in Figure 1, into a generally upright operative position shown in dot-dash lines in Figure 1, or in full lines in Figure 4. In this operative position it is located to the rear of and substantially in alignment with, but directed transversely of the thrust axis of the jet stream issuing from the rear of the engine 9. Its rearward spacing is sufficient to avoid choking the exit of the gas, but close enough to intercept substantially all such gas. It is shown as asymmetrically positioned relative to the thrust axis, in that its upper end does not extend appreciably if at all above the upper level of the tailpipe, whereas its lower end projects well below the strut 92 and the lower level of the tailpipe. A symmetrical position would serve well enough, but in this particular design the proximity of the strut's lower edge 92 prevents upward extension of the V-gutter. Since an adequate thrust-reverser area is of importance, such area is achieved in this design by downward extension of the V-gutter to a level well below the tailpipe and engine housing. This downward extension of the V-gutter, and the blocking of exit of the gases by upper vanes 51, 52, causes the gases to follow a generally downward path within the gutter, and when they encounter the lower vanes 51, 52 they are directed forwardly beneath the engine housing 9. Some gases will be deflected forwardly by the baffles themselves, and by the upper vanes 51, 52, to flow forwardly around the engine housing.

The connection between the actuator 2 and the mounting 11 is indirect, for thereby the same actuator can unfold or fold a two-part folding brace 31, 32, which brace when unfolded braces the post 11 in its projected position reacting from the aircraft structure at 30, and transmitting thrust-reversal loads in this manner. Thus, for example, the brace part 32 is fastened to a rock shaft 30 carried within the recess, and the brace part 31 is pivotally connected at 33 to the post 11 below its fixed pivot at 12. Articulated links 3, 34 are connected to the common pivot between the brace parts 31, 32 at 35, and the brace part 3 is formed as a bell-crank lever pivoted at 21 to the upper end of the mounting 11, but connected at 36 to the actuator 2. The arrangement is such that movement of the actuator in the extending sense causes the link 3 to rotate about the pivot at 21 at the same time as it is also thrusting on that pivot in a line above the fixed pivot at 12, to effect swinging of the mounting 11. By the time the mounting has been swung from its generally horizontal, retracted position to its projected, generally upright position the brace 31, 32 has its parts in alignment, and they are held in that position by the now aligned articulated links 3, 34, and so the mounting 11 and the baffles 1a and 1b thereon are held securely in their projected position.

In order that the thrust-reverser device may be contracted or folded into small enough compass to enter the recess 93, for storage therein, it is necessary to provide mechanism to effect the folding of the baffles by hinging them about their respective hinge axes at 10 to enable the thrust-reverser device to move from its operative position into its retracted or stored position.

In order to effect the unfolding of the baffles 1a and 1b during the projective movement of the mounting 11, and, conversely, to effect folding of the baffles during retractive movement of the mounting, a pair of links 41 and 42 are pivotally connected to each other and to the respective baffles 1a and 1b outwardly of the latter's hinges at 10. In addition these links 41 and 42 are hingedly connected at their common pivot to a sliding block 4, which is guided on a pin 40, which pin is carried upon and projects substantially at right angles to the length of the mounting post 11. The movement of the block 4 along the guide pin 40 is controlled in coordination with the swinging of the mounting about its pivot at 12 by mechanism such as the slidable guide 43, 44 connected at 45 to the mounting, and connected to the block through a link 46. Thereby, as the mounting 11 swings about its pivot at 12, the block 4 is caused to slide along the pin 40. The block 4 slides inwardly toward the mounting upon projective swinging of the mounting, and outwardly along the pin upon retractive movement of the mounting. A stop surface 47 engages the block 4 when the parts reach the fully projected position, and positively stops any movement of the links 41, 42 into a position of alignment, holding them somewhat off alignment so that they will refold upon retractive movement of the mounting. By such mechanism as that just described the movement of the parts into projected position automatically accomplishes swinging of the baffles into an outwardly and forwardly inclined position with respect to the post and to each other, and they can be of such area and extent, of such length, and so located that, since they project at opposite sides of the thrust axis, they will intercept and tend to contain the issuing jet, so that bottom end vanes 51 and 52, as hereinafter explained, may direct the main portion of the flow forwardly underneath the engine nacelle. Such portion of the flow as escapes containment will itself be reversed by the baffles 1a and 1b and the upper end vanes 51 and 52, also referred to hereinafter, along the respective sides of these several baffles and vanes.

Upon swinging of the mounting 11 into or towards its retracted position it is obvious that the parts are so coordinated that the baffles 1a and 1b will be swung into their contracted relationship, shown in Figure 2 and shown in dot-dash lines in Figure 3, by the time the mounting reaches and is swung within the recess 93. In their expanded relationship the baffles 1a and 1b form a V-gutter for the purposes indicated above, but in their folded contracted relationship they occupy the minimum of space.

The V-gutter defined by the outspread baffles 1a, 1b, is not, without at least the bottom end closure vanes 51, 52, highly efficient in reversing the thrust. The upper end closure vanes 51 and 52 are desirable also for assisting in containing the gases, in addition to their protective function, referred to below. Without at least the lower end closure vanes, too much of the issuing gases of the jet would escape by way of the open lower end of the V-gutter, and the reversing effect of the baffles 1a, 1b alone would be slight. It is necessary first to contain these gases, which is the primary function of the baffles 1a and 1b, and then to effect their reversal of direction, which is the primary function of the lower end closure vanes 51, 52. The upper end closure vanes 51, 52 serve to protect the adjacent structure, and the recess 93, from impingement by or entry of the hot gases. In addition, they serve to contain the gases, so that the intercepted and reversed gases will leave the V-gutter principally at the lower end thereof, and will be directed forwardly beneath the engine.

The end closure vanes 51, 52 are of a generally triangular or truncated triangular form, and the two vanes of a pair are pivotally connected together at 50, along a common edge. Each is pivotally connected at 53 and 54 to the respective baffles 1a and 1b at the end edges of the latter. These vanes are of such size and shape that they will lack something of coming into coplanar relationship when the baffles are fully unfolded and stopped in their unfolded position, wherefore when the baffles are folded again the vanes 51 and 52 of each pair will fold together, preferably within the space between the baffles, for retraction within the recess 93. The engagement of the slide block 4 with its stop at 47 thus serves to limit also the unfolding of the vanes 51 and 52 of a pair, as well as of the baffles 1a and 1b.

It has been indicated by shadowgraphs that the lower vanes 51, 52, in the unfolded or operative position of the parts, and particularly the lower pair, are responsible for a major portion of the reversal of thrust. The gases of the jet stream are contained by the baffles 1a, 1b, assisted by the upper vanes 51, 52, and are directed primarily downwardly. Impinging the lower vanes 51, 52, these gases are directed forwardly beneath the engine 9. This rotative flow pattern is induced in part by the projection of the reverser device below the engine, but the presence of the lower vanes is essential to produce the desired results. The baffles 1a and 1b also effect some reversal, although their function is primarily one of containment.

Mechanism for operating the doors 94 is preferably coordinated with the other mechanism already described. By fixing a lever 61 to each door 94 and by engaging the end of that lever within a cam slot 60 of a cam 6 which is secured upon the rock shaft 30, the doors may be swung open with the first projective movement of the other parts. To this end the cam slot 60 is provided with an inclined initial section 62, which accomplishes the outward swinging of the doors in projection of parts, and the remaining portion of the cam slot 60 may be considered a holding portion, to retain the doors in their outswung position, notwithstanding the air stream acting upon them. Furthermore, in retracting, the doors are held open until the retractive movement of parts is virtually completed, whereupon the final inclined portion 62 effects closure of the doors and retains them closed. Springs 63 may assist in holding the levers 61 within their respective cam slots. It will be understood that the door-opening and closing mechanism is suggestive rather than restrictive, but it illustrates that the entire mechanism may be coordinated for operation by a single actuator 2.

We claim as our invention:

1. The combination, for use with a jet engine having a rearwardly directed tailpipe exit, comprising a transversely thin engine-supporting strut having a recess with an entrance opening in its edge adjacent to such tailpipe exit, a gas-deflecting structure including two baffles, means supporting said baffles and guiding them for relative movement between an expanded relationship diverging forwardly and of a total lateral extent greater than the width of such recess entrance opening and a contracted relationship of a total lateral extent less than the width of such recess entrance opening, means for effecting movement of said baffles from one such relationship to the other such relationship, and suspension means supporting said gas-deflecting structure from said strut and including means for moving said gas-deflecting structure through such recess entrance opening with said baffles in their contracted relationship toward an operative position behind the tailpipe exit or a retracted position within the recess.

2. The combination of claim 1, wherein the suspension means supports the gas-deflecting structure in its operative position with its lower portion projecting far enough below the engine-supporting strut to deflect, forwardly beneath the engine, gases discharged rearwardly from the tailpipe exit.

3. The combination of claim 1, including means separate from and operatively connected to the retracting means to decrease the frontal area of the gas-deflecting structure during its retraction, and to increase its frontal area during its movement into operative position.

4. In combination with a jet engine and engine-supporting aircraft structure having an opening adjacent the exit of the engine's tailpipe, a pair of baffles hingedly supported along a common edge to define a V-gutter, closures disposed across the ends of said V-gutter, the end closures and baffles cooperating to constitute gas-deflecting means, mechanism supporting said gas-deflecting means and guiding the same for movement, with the baffles folded together, through said opening in the aircraft structure from an operative position wherein the V-gutter is immediately to the rear of but spaced behind, and oriented crosswise of the tailpipe, with the baffles directed forwardly and outwardly, to a retracted position within the aircraft structure, with the baffles folded together, means so to close and to open the vanes during their passage through the opening, and an actuator for moving the gas-deflecting means between such two positions.

5. The combination of claim 4, wherein two vanes hingedly connected together, and hingedly connected to the ends of the respective baffles, constitute the end closures, and wherein the vanes are foldable, with the baffles, into generally parallel planes for passage through the opening in the aircraft structure between operative and retractive positions.

6. The combination of claim 5, including vane-folding mechanism operatively coordinated with the baffle-opening-and-closing means.

7. The combination of claim 4, including also door means to close said opening, and means operatively connected to the supporting mechanism to open said doors prior to projection of the gas-deflecting means into operative position, and to close them, to restore the skin continuity of the aircraft structure, upon return of the gas-deflecting means to its retracted position.

8. In combination with a jet engine and engine-supporting aircraft structure having a downwardly directed opening located a short distance to the rear of and above the exit of the engine's tailpipe, a pair of baffles hingedly joined along an edge, mechanism supporting said baffles from within the aircraft structure and guiding them for movement through said opening between a retracted position, wherein they are within the aircraft structure, and an operative position, wherein they are projected into the jet stream, and located behind the tailpipe, an actuator so to move the baffles between such positions, and means coordinated with the baffles and their supporting mechanism to open them hingedly into mutually oppositely and forwardly inclined attitudes by the time they reach their operative position, whereby to intercept the jet stream and to deflect it forwardly, and to fold them hingedly into a generally adjacent attitude by the time they pass through said opening, and while in their retracted position.

9. The combination of claim 8, wherein the engine-supporting aircraft structure is a strut of generally slight transverse thickness, in comparison to the engine, doors supported thereon for closing the opening, and door-actuating mechanism coordinated with the baffle-supporting mechanism for opening said doors for projection of the baffles, and for closing said doors upon return of the folded baffles to their retracted position.

10. In combination with a jet engine for aircraft propulsion, and a transversely narrow engine-supporting strut directed upwardly from the engine and having its lower edge inclined upwardly and rearwardly from the vicinity of the exit of the engine's tailpipe, said inclined lower edge being recessed near and to the rear of such exit; an elongated mounting pivotally supported within the strut to swing outwardly and downwardly from within said recess, about a transverse axis between a projected position wherein it is directed uprightly and transversely of the jet thrust axis, to the rear of the tailpipe, and a retracted position within the recess; a pair of baffles hingedly mounted by their rear edges on said mounting to swing on axes directed generally lengthwise of the mounting, between a folded position wherein their forward faces lie in generally parallel planes, to an unfolded position wherein such faces are inclined outwardly and forwardly at the opposite sides of the jet thrust axis when the mounting is in its projected position; an actuator mounted within the strut; movement controlling mechanism operatively connecting the mounting and said actuator, for movement of the mounting between its projected and retracted positions; means coordinated with said mounting and its movement-controlling mechanism, and operatively connected to said baffles to move them to unfolded position by the time the mounting reaches its projected position, and to move them substantially to folded position by the time the mounting, during its retraction, passes into said recess; two pairs of generally triangular end-closing vanes, one pair at each end of the baffles, the two vanes of each pair being hingedly connected together along a common edge, and the individual vanes being hingedly mounted along another edge to the corresponding end edge of the adjacent baffle, for folding and unfolding with the baffles, and stop means to limit unfolding of the vanes to a position less than a coplanar one.

11. The combination of claim 10, including also closure means for the strut's recess mounted for movement between closed and open positions, mechanism for opening and closing said closure means, and an operative connection between the movement-controlling means for the baffles' mounting and said opening and closing mechanism for the closure means, organized and arranged to open said closure means prior to projection of the mounting, and to close said closure means upon retraction of the mounting, with its baffles and vanes, into the recess.

12. In combination with a jet engine for aircraft propulsion, and a transversely narrow engine-supporting strut directed upwardly from the engine and having its lower edge inclined upwardly and rearwardly from, and apertured in the vicinity of, the exit of the engine's tailpipe, a post pivotally mounted within said strut to swing about a transverse horizontal axis through said aperture between a retracted position within the strut, and a projected generally upright position to the rear of and in alignment with the thrust axis of the issuing jet, a pair of baffles hingedly mounted on said post each to swing about an axis directed lengthwise of the post, and each having an inner jet-intercepting surface directed forwardly from such axis, an actuator mounted within the recess, means operatively connecting said actuator and said post to swing the latter between its retracted and projected positions, a guide pin carried by said post and directed generally forwardly therefrom when the post is in its projected position, a guide block guided thereon for movement along said pin, a pair of links interconnecting said guide block and the respective baffles, mechanism coordinating movement of the guide block with swinging of the post, and arranged to swing said baffles apart into positions inclined forwardly and outwardly from the post as the latter swings to its projected position, and to swing them towards one another as the post swings towards its retracted position, and stop means to limit outward swinging of the pair of baffles.

13. The combination of claim 12, including end-closing vanes pivotally joined along a common edge, and hingedly mounted to the end edges of the respective baffles, along hinge axes inclined oppositely relative to their common pivot axis, the stop means being also organized and arranged, relative to said vanes, to limit their unfolding movement to a position short of coplanar.

14. The combination of claim 12, wherein the connecting means between the actuator and the post includes a foldable two-part brace the parts whereof are movable into alignment to maintain the post in its projected position, and a connection between the actuator and said brace to fold the brace parts as the post is moved by the actuator into its retracted position.

15. In combination with the tailpipe of a jet engine, and with a transversely thin aircraft structure supporting said engine, a gas-deflecting structure which in its operative position defines a generally V-shaped gutter of greater width than said thin aircraft structure, means to support said structure in operative position spaced behind and with its gutter disposed crosswise of the tailpipe but in position to intercept the issuing gases, the gas-deflecting structure's gutter being of a size to receive and to deflect forwardly a substantial portion of the issuing gases, means for moving said gas-deflecting structure between its operative or intercepting position and a retracted position, clear of the tailpipe and within the aircraft structure, the latter having an aperture at its edge opening to an interior recess for entrance and exit of the gas-deflecting structure, and means for collapsing the gas-deflecting structure during its movement towards retracted position, to enable its passage through said aperture into the interior recess in the thin aircraft structure.

16. The combination of claim 15, the gas-deflecting structure including means to close at least the lower end of the gutter, said end-closing means being also arranged for collapse coincident with collapse of the remainder of the gas-deflecting structure preliminarily to movement through the aperture into retracted position.

References Cited in the file of this patent

UNITED STATES PATENTS

| | | |
|---|---|---|
| 93,337 | Paradis | Aug. 3, 1869 |
| 141,340 | Evans | July 29, 1873 |
| 2,395,435 | Thompson et al. | Feb. 26, 1946 |
| 2,422,744 | O'Neil | June 24, 1947 |
| 2,620,622 | Lundberg | Dec. 9, 1952 |
| 2,620,623 | Imbert | Dec. 9, 1952 |
| 2,621,004 | Ashton et al. | Dec. 9, 1952 |
| 2,630,990 | Kanode et al. | Mar. 10, 1953 |
| 2,696,079 | Kappus | Dec. 7, 1954 |